United States Patent
Donaldson

(10) Patent No.: US 7,239,820 B2
(45) Date of Patent: Jul. 3, 2007

(54) TONE REPRODUCTION CURVE SYSTEMS AND METHODS

(75) Inventor: Patricia J. Donaldson, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 142 days.

(21) Appl. No.: 11/120,783

(22) Filed: May 3, 2005

(65) Prior Publication Data

US 2006/0251437 A1    Nov. 9, 2006

(51) Int. Cl.
*G03G 15/00* (2006.01)

(52) U.S. Cl. ............................................. 399/49

(58) Field of Classification Search .............. 399/38, 399/49, 60, 72
See application file for complete search history.

(56) References Cited

U.S. PATENT DOCUMENTS

| | | | |
|---|---|---|---|
| 6,035,152 A * | 3/2000 | Craig et al. | 399/49 |
| 6,556,793 B2 * | 4/2003 | Nakamura | 399/49 X |
| 6,694,109 B1 | 2/2004 | Donaldson et al. | |
| 6,697,582 B1 * | 2/2004 | Scheuer | 399/49 |
| 2004/0165199 A1 | 8/2004 | Klassen et al. | |

\* cited by examiner

*Primary Examiner*—Sandra L. Brase
(74) *Attorney, Agent, or Firm*—Gibb I.P. Law Firm, LLC

(57) ABSTRACT

In-situ measurements are made by a toner area coverage sensor on test patches from a single control dot screen developed on a cleanable surface and are observed by a photoreceptor. The density of patches for other dot screens is estimated from the measured density of the control dot screen error of each measured patch by using a scaling factor, which is different for each separation and patchy density. This error is then added to the target tone reproduction curve (TRC) for each non-control dot screen to give an estimated density for each of the other dot screens. The TRC are then developed/updated using the estimated patch densities for each of the other dot screens. This substantially reduces the amount of toner and processing resources utilized.

20 Claims, 7 Drawing Sheets

TONE REPRODUCTION CURVE SYSTEMS AND METHODS

BACKGROUND

Embodiments herein generally relate to using tone reproduction curves to maintain optimal print engine performance.

As described in U.S. Patent Publication 2004/0165199 (incorporated herein by reference) an imaging device in the form of a printer or copier typically creates images using combinations of four colors of marking agents or colorants, such as cyan, magenta, yellow and black (CMYK). The images are created based on image data which assigns at least one of the four colors and a numerical color intensity or input color value to each picture element or pixel in the image.

A problem is that, due to manufacturing variations, different imaging devices can output different intensities of color based on identical image data. The density of the toner laid down on the print medium determines the color intensity. The denser or thicker the toner is laid down on a white print medium such as paper, the less white is visible through the toner on the paper. Consequently, the denser the toner, the less the lightness of the toner color, and the greater the intensity of the toner color.

Because there is such variation in toner density laid down by different imaging devices based on identical image data, color intensities that are output by some imaging devices can be outside of an acceptable range. Thus, in order to ensure that each imaging device outputs color intensities that closely correspond to the color intensities specified by the image data, each imaging device should be individually calibrated to output appropriate color intensities.

One approach in calibrating an imaging device is to use a tone reproduction curve (TRC), which is a modeled mathematical relationship between the input color values and the colorant amounts that must be sent to the imaging device in order to produce the intensities specified by the input color values. The TRC is a continuous curve on a plot of input color values versus output colorant values that represents a best fit of the discrete data points matching each input color value with an output colorant value that, when rendered on the given device, produces the intensity specified by the input color value.

As described in U.S. Pat. No. 6,694,109 (incorporated herein by reference) in the case of printing devices such as a laser printer, the surface that is typically of most interest in determining the density of printing material thereon is the charge retentive surface or photoreceptor on which the electrostatic latent image is formed and subsequently developed by causing toner particles to adhere to areas thereof that are charged in a particular way. In such a case, an optical device, often referred to as a densitometer, for determining the density of toner on the test patch is disposed along the path of the photoreceptor directly downstream of the development unit. There is typically a process within the operating system of the printer to periodically create test patches of the desired density at predetermined locations on the photoreceptor by deliberately causing the exposure system thereof to change or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor and the light absorption of the test patch is tested. The density of toner on the patch varies in direct relationship to the percentage of light absorbed by the test patch.

Test patches that are used to measure the deposition of toner on paper to measure and control the tone reproduction curve (TRC) are traditionally printed on inter-document zones of the photoreceptor belts or drums. Generally, each patch is a small square that is printed as a uniform solid halftone or background area. This practice enables the sensor to read values on the TRC for each test patch.

A processor of the imaging device calculates a separate TRC for each of the colors or separations of the imaging device. The TRCs are used to calibrate the imaging device. More particularly, once such TRCs are established for an imaging device, the TRCs can be used to correlate input color values with imaging device output image colorant values or color intensities. In addition, a multi-dimensional look up table or LUT is often calculated to account for interactions among the colorants and to accommodate different input color spaces, for example, CIELAB or sRGB. Numerous techniques exist in the prior art for deriving LUTs and TRCs for printer calibration and characterization.

Each of the test patches is formed with a different combination of a colorant (C, M, Y or K) and a numeric input color value. The input color value specifies the desired colorant density, and consequently, the desired output lightness color value or color intensity. The density of the colorant on the test patches varies as a function of the input color value. Thus, optically measuring the density of the patches provides an indication of the input color values with which the patches were made. The denser the colorant on the test patch, the more light will be absorbed by the colorant, and the less light will be reflected back to the optical color-measuring device. This indicates a greater intensity provided by the colorant. The printed test patches are moved past the color-measuring device, and the light absorption of the test patch is measured.

The measurements of the test patches and the input color values used to construct them are used to calculate the TRC. The accuracy of the TRC increases with the number of data points that it is based upon. Measurement error drops by a factor of the square root of the number of measurements. However, from a cost viewpoint, it is desirable to minimize the number of test patches that are printed, since printing test patches consumes a significant amount of colorant.

SUMMARY

One embodiment herein comprises a method that produces test patches within a print engine using a control printing resolution (dot screen) during standard (non-testing) printing operations and measures the actual tone density of the test patches. Using this information the method calculates an actual tone reproduction curve for the control printing resolution from the actual tone density of the test patches. The method then compares the actual tone reproduction curve with a target tone reproduction curve for the control printing resolution to determine an actual error value for each test patch. From this, the method can calculate estimated error values of tone density for corresponding test patches of non-control printing resolution(s) based on a predetermined correlation between tone density errors of the control printing resolution and tone density errors of the non-control printing resolution. This allows the method to change operating characteristics of the print engine to move the standard printing operations closer to the target tone reproduction curve.

The method establishes the predetermined correlation between the tone density errors of the control printing resolution and the tone density errors of the non-control printing resolution based on empirical testing. When calculating the estimated error values of the tone density for the corresponding test patches, the method multiplies each actual error value for each test patch by a predetermined scaling factor. The scaling factor correlates the tone density errors of the control printing resolution and the tone density errors of the non-control printing resolution. Different non-control printing resolutions will have different scaling factors with respect to the control printing resolution.

Also, each of the test patches comprises a different printing tone. When comparing the actual tone reproduction curve with the target tone reproduction curve the method compares multiple printing tones along the target tone reproduction curve. The control printing resolution and the non-control printing resolution are both utilized to perform standard (non-testing) printing operations by the print engine.

A system embodiment comprises a print engine that produces test patches using a control printing resolution, a detector that measures the actual tone density of the test patches, and a processor. The processor calculates the actual tone reproduction curve for the control printing resolution from the actual tone density of the test patches. The processor can include, or be connected to, a comparator that compares the actual tone reproduction curve with a target tone reproduction curve for the control printing resolution to determine an actual error value for each test patch. Then, the processor can calculate the estimated error values of tone density for corresponding test patches of the non-control printing resolution(s) based on the predetermined correlation between tone density errors of the control printing resolution and the tone density errors of the non-control printing resolution. Also, the processor establishes the predetermined correlation between the tone density errors of the control printing resolution and the tone density errors of the non-control printing resolution based on empirical testing.

When calculating the estimated error values of the tone density for the corresponding test patches, the processor multiplies each actual error value for each test patch by a predetermined scaling factor of tone density errors of the control printing resolution and tone density errors of the non-control printing resolution. When comparing the actual tone reproduction curve with the target tone reproduction curve the processor compares multiple printing tones along the target tone reproduction curve.

Thus, with the embodiments herein, in-situ measurements are made by a toner area coverage sensor on TRC patches from a single control dot screen developed on a cleanable surface and observed by a photoreceptor. The density of patches for other dot screens is estimated from the measured density of the control dot screen error of each measured patch multiplied by a scaling factor, which is different for each separation and patchy density. This error is then added to the target TRC for each non-control dot screen to give an estimated density for each of the other dot screens. The TRC are then developed/updated using the estimated patch densities for each of the other dot screens. This substantially reduces the amount of toner and processing resources utilized.

These and other features are described in, or are apparent from, the following detailed description.

BRIEF DESCRIPTION OF THE DRAWINGS

Various exemplary embodiments of the systems and methods described in detail below, with reference to the attached drawing figures, in which.

DETAILED DESCRIPTION

Figure 1:
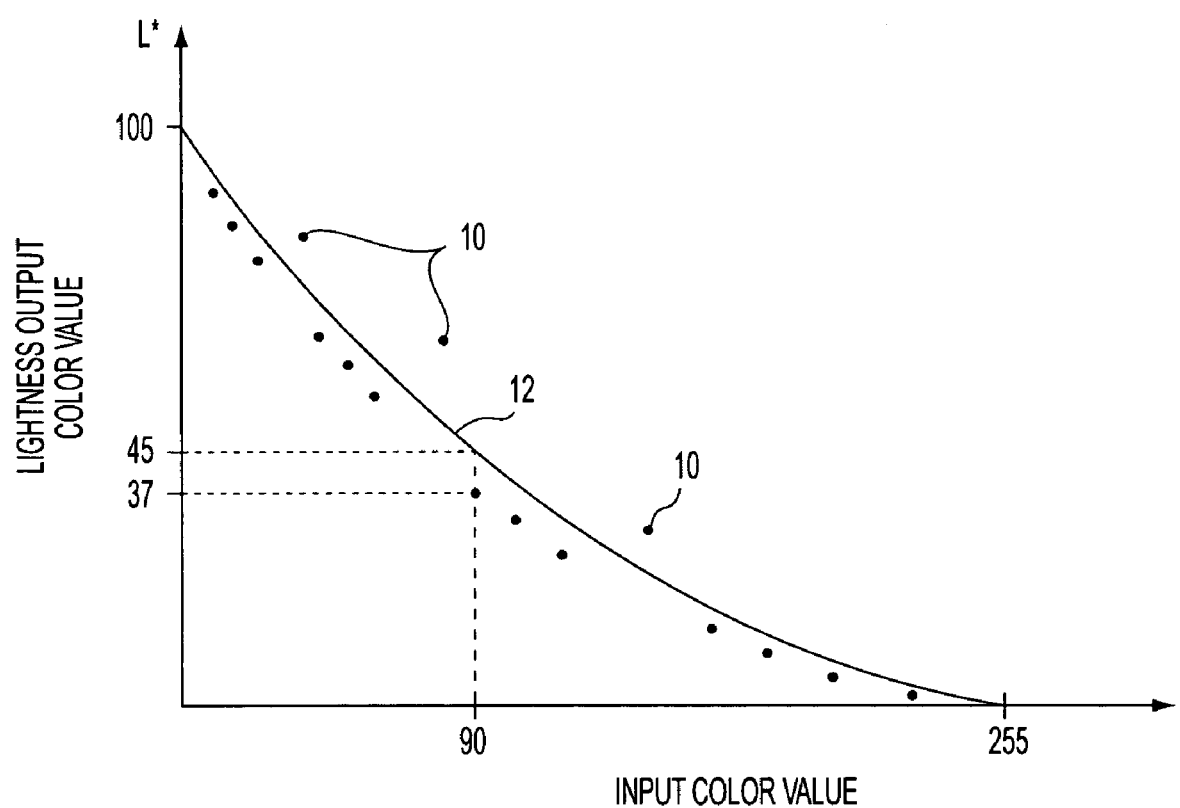
FIG. 1 is a schematic representation of a tone reproduction curve.

As discussed above, conventional methods and systems utilize patches to adjust the look up table so that the printed TRC maintains its shape through a range of process variations. Improved control of the separation TRCs improves color stability, which is a significant driver of customer satisfaction. However, in systems that have the capability to print utilizing multiple dot screens (where each different dot screen has a different printing resolution by virtue of a different printing pixel density and pattern) the process of developing and updating the TRCs is time, toner, and resource intensive. Therefore, the embodiments described below utilize a single dot screen (a control dot screen) to reduce processing time and the amount of toner used. The embodiments estimate (using a scaling factor) the density of all other dot screens based on the density of just one of the dot screens (the control dot screen having a control resolution).

More specifically, when developing/updating the TRCs and LUTs, multiple patches are printed on a cleanable surface that is partially exposed between the edges of sheets of the printing medium passing through the printing engine. These patches are then checked with a photoreceptor to determine the density of toner being printed by the printing engine. After the photoreceptors observe the patches, they are cleaned from the cleanable surface; however, the cleaning process requires a certain amount of time. Therefore, there is a delay required to clean the surface upon which the patches are printed before the next series of patches can be printed on this cleanable surface. Further, the information obtained by the photoreceptors must be processed, which also requires a certain amount of time. Therefore, there is also delay associated with the processing of the information from the photoreceptors as used to develop or update the TRCs.

It is common for multiple patches to be simultaneously printed on the cleanable surface. Each of the patches represents a different toner density for one color utilizing one dot pattern. In other words, each set of patches that is simultaneously printed on the cleanable surface are different shades of a single color for a single dot pattern. As mentioned above, most color printers utilize 4 different colors to create colorized images. If a printing engine is capable of printing 4 colors and 4 dot screens (resolutions), this would require 16 sets of patches, or 16 printing, processing, and cleaning runs to be performed. Further, if a large number of patches are printed in each set of patches, such as 9 patches, the processor would process 144 patches. The time and processing resources to print 16 sets of patches and process 144 individual patches is substantial and can overwhelm some processors. In view of the foregoing, embodiments herein utilizes one of the printing engine's dot screens (one of the resolutions) as a control dot screen, and estimates the printing engine's other dot screens based upon the actual observed results of the control dot screen. Therefore, with embodiments herein, a 4-color printing engine could develop/update TRCs and LUTs for all its different dot screens by printing, observing and processing just 4 sets of patches (which, for a system that utilizes 9 patches per set, would only require the processor to process 36 individual patches).

Thus, with the embodiments herein, in-situ measurements are made by a toner area coverage sensor on TRC patches from a single control dot screen developed on a cleanable surface and observed by a photoreceptor. The density of patches for other dot screens is estimated from the measured density of the control dot screen error of each measured patch multiplied by a scaling factor, which is different for each separation and patchy density. This error is then added to the target TRC for each non-control dot screen to give an estimated density for each of the other dot screens. The TRC are then developed/updated using the estimated patch densities for each of the other dot screens. This substantially reduces the amount of toner and processing resources utilized.

FIG. 1 is a plot of input color values that are used to produce single-colorant test patches versus corresponding lightness (L* in CIELAB color space) output color values that are measured from the test patches, and is shown in U.S. Publication 2004/0165199, incorporated herein by reference. It can be assumed that the input color value is a grey scale value ranging from 0 (white) to 255 (black). In the example of FIG. 1, streaking has caused certain outlying data points 10, or outliers, which are measured from test patches that are within the same column of the array of test patches. These outliers 10 are clearly anomalous when compared to the other data points.

A TRC 12 is calculated to fit the data, including the outliers 10. The TRC 12 is a compromise between the outliers 10 and the remaining data. The remaining data is reproducible, and is therefore the best predictor of the future color output characteristics of the imaging machine. The TRC 12 represents the best known fit of the available data (which includes the outliers), and is subsequently used to calibrate the imaging device. In the example of FIG. 1, if the imaging device desires to produce an output color value of 45, then it will use an input color value of 90 in accordance with the TRC 12.

Figure 2:
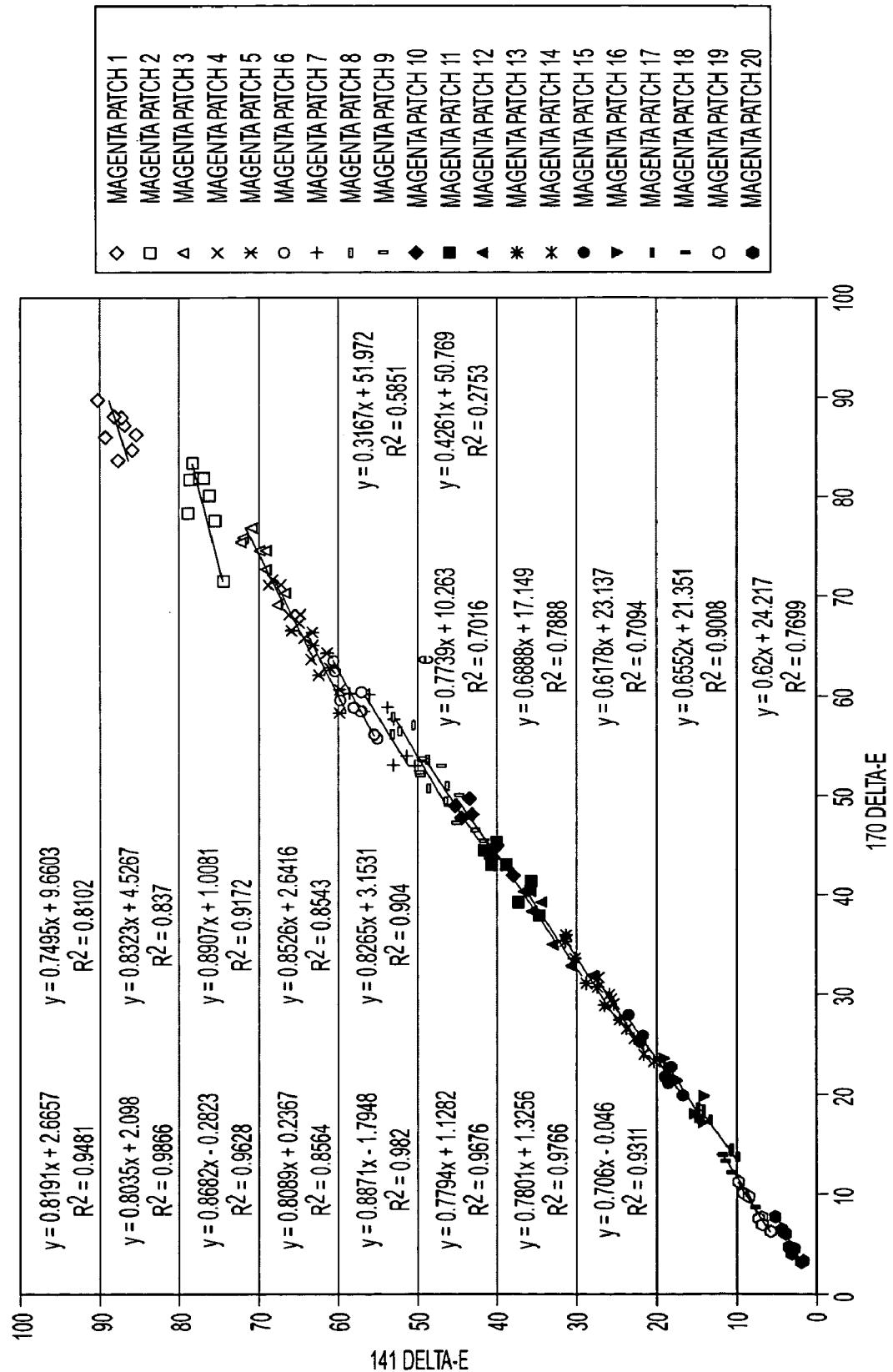
FIG. 2 is a chart showing the correlation between errors of different printing resolutions.

The embodiments herein were developed with the unique understanding that the density errors in TRCs from different dot screens are linearly correlated. More specifically, as shown in FIG. 2, the correlation of 20 different patches between a dot screen having 141 dots per inch (dpi) resolution and a dot screen having 170 dpi resolution is graphically shown as being very linear. More specifically the Delta-E (difference between colors) in FIG. 2 represents the difference (error) between the actual tone reproduction curve seen during the experiment when compared to the target tone reproduction curve for the print engine used in the experiment. Note that the scale used for each axis of the graph shown in FIG. 2 is the same and the approximately 45° line formed from the data represents a linear relationship between the two error (Delta-E) measurements. There are multiple data points for each of the 20 patches because the experiment was repeated in many different processing conditions in an attempt to cause shifts in the tone reproduction curve.

The data used to create FIG. 2 was gained from an experiment utilizing different processing conditions known to cause shifts in the TRC. The 170 dot screen was arbitrarily selected as the control resolution. The 141 dot screen was printed and the TRC from the 141 dot screen was compared to the TRC of the control 170 dot screen. In FIG. 2 the data points associated with each of the 20 different patches are averaged into a single slope line. Therefore, FIG. 2 actually shows 20 separate average slope lines which combine to form a substantially linear relationship between the 170 dpi dot screen and the 141 dpi dot screen.

Figure 3:
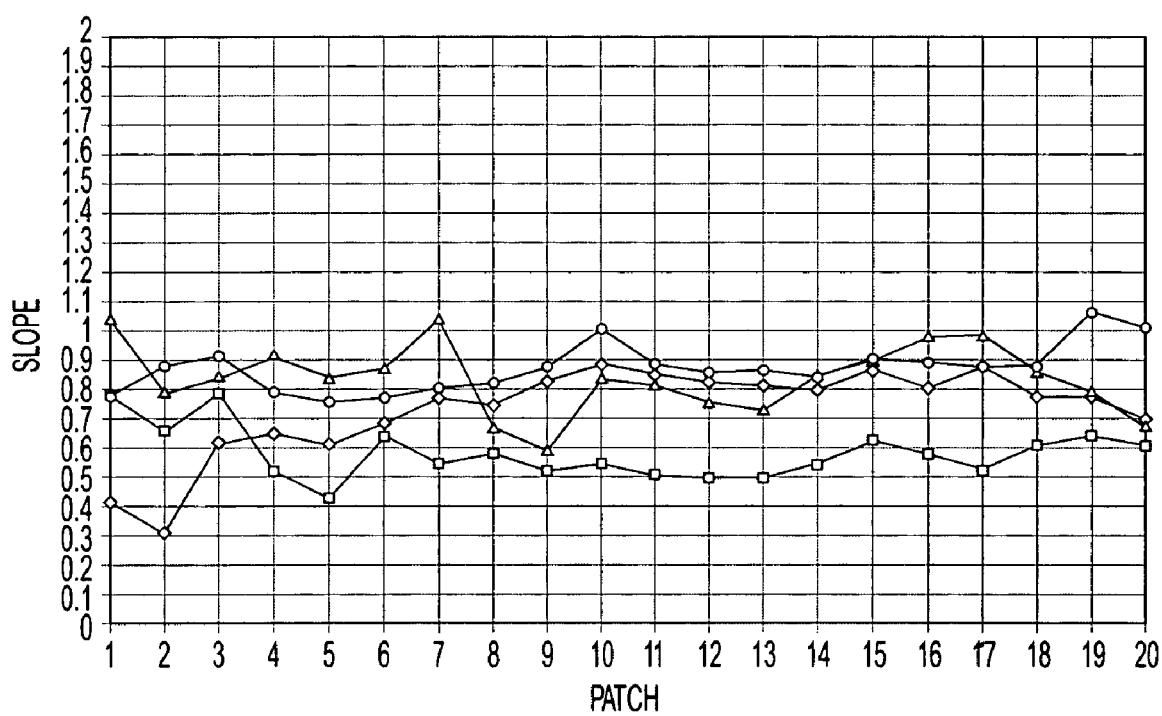
FIGS. 3–5 are charts showing the slope between error rates of different printing resolutions for different colors.
Figure 4:
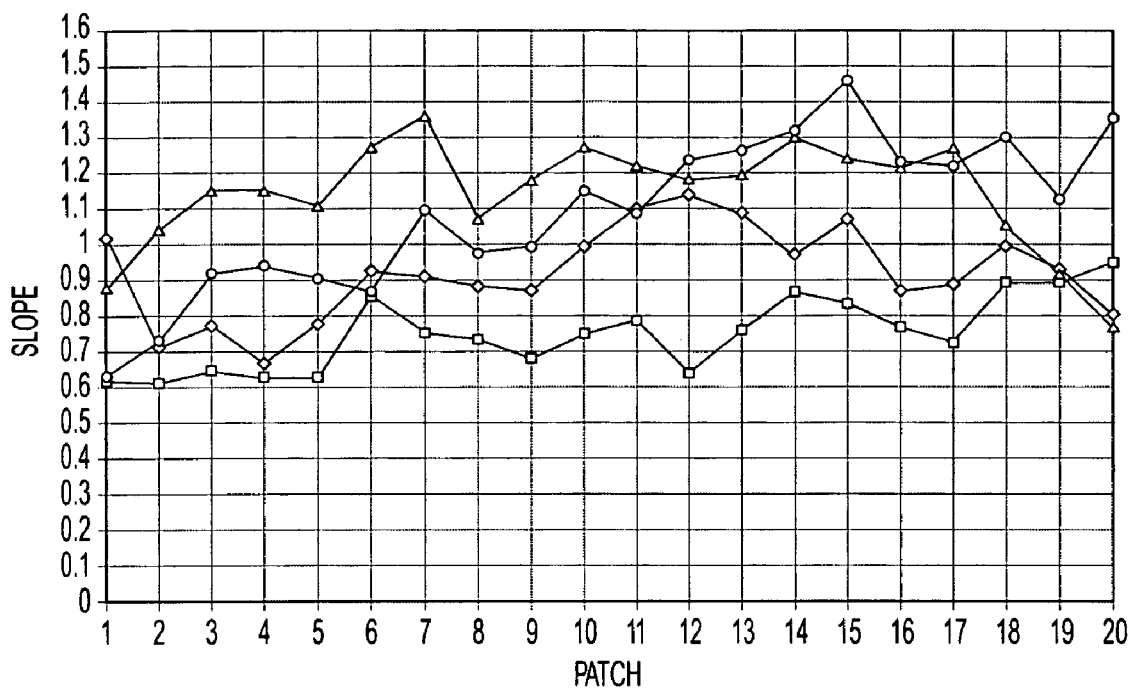
Figure 5:
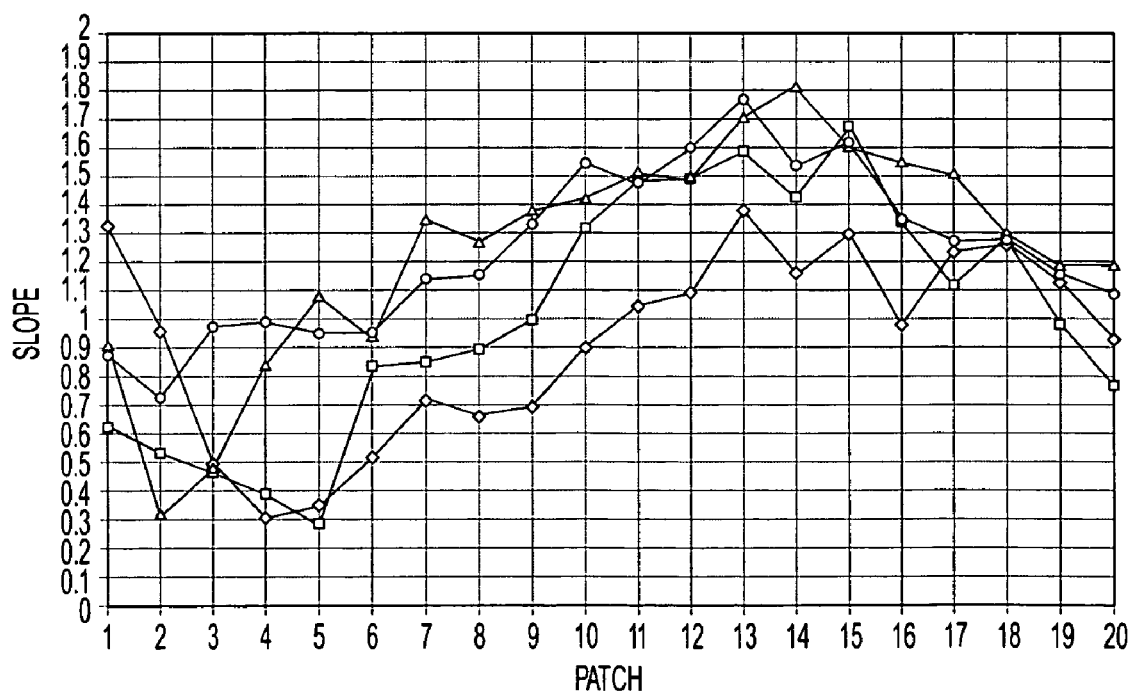

The same experiment was repeated for a 212 dot screen and a stoclustic dot screen and comparisons of the same are shown in FIGS. 3–5. Each of FIGS. 3–5 illustrates the correspondence between the error slope of the non-control dot screens (141 dot screen, 212 dot screen, and stoclustic dot screen) and the control dot screen (chosen in this example to be the 170 dot screen). In each of FIGS. 3–5, data points were collected for the four colors commonly used in today's color printers including black (shown as circle shapes in FIGS. 3–5) yellow (shown as square shapes in FIGS. 3–5) magenta (shown as triangle shapes in FIGS. 3–5) and cyan (shown as diamond shapes in FIGS. 3–5). From this data, various scaling factors can be developed. For example, with respect to the control dot screen (170 dot screen) the 141 dot screen can have a scale factor of 0.74; the 212 dot screen can have a scale factor of 0.97; and the stoclustic dot screen can have a scale factor of 1.1. As would be understood by one ordinarily skilled in the art, these numbers are only exemplary and relate to the specific print engine utilized in the experiments. Different print engines would behave differently and different scale factors would be developed for each different print engine and/or type of print engine. Similarly, while 4 different types of dot screens are mentioned above, the embodiments herein is equally applicable to any type of dot screen and any type of printing engine.

Figure 6:
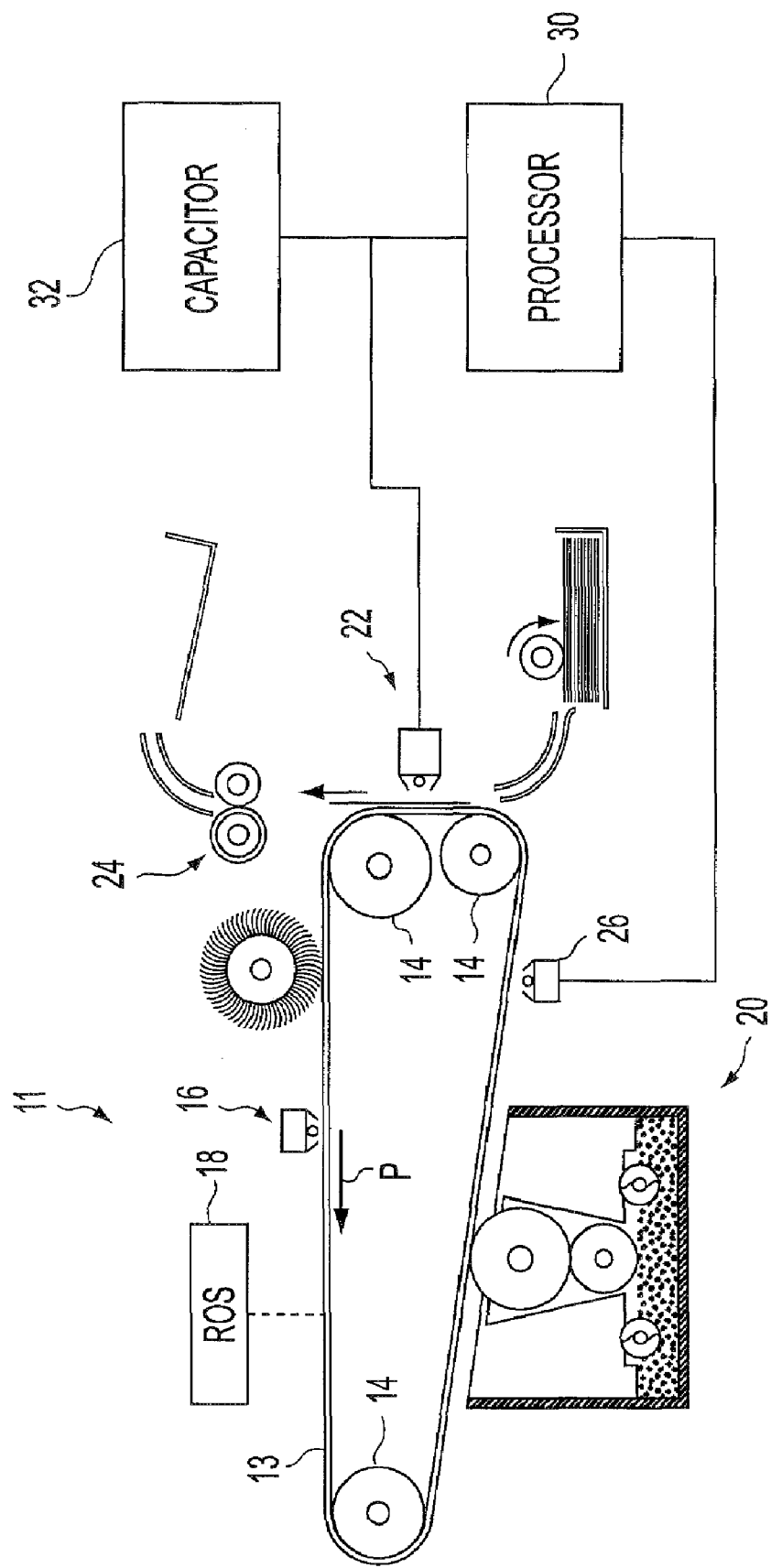
FIGS. 6 is a schematic representation of a printing engine.

FIG. 6 is a schematic representation of a system suitable for incorporating embodiments of the present embodiments herein. Included within printing electrophotographic system 11 is a photoreceptor 13 which may be in the form of a belt or drum and which comprises a charge retention surface. In this embodiment, photoreceptor 13 is entrained on a set of rollers 14 and caused to move in a counter-clockwise process direction by means such as a motor (not shown).

The first step in an electrophotographic process is the charging of the relevant photoreceptor surface. This initial charging is performed by a charge source 16. The charged portions of the photoreceptor 13 are then selectively discharged in a configuration corresponding to the desired image to be printed by a raster output scanner (ROS) 18. ROS 18 generally comprises a laser source (not shown) and a rotatable mirror (also not shown) acting together in a manner known in the art to discharge certain areas of the charged photoreceptor 13. Although a laser source is shown in the exemplary embodiment, other systems that can be used for this purpose include, for example, an LED bar or a light lens system. The laser source is modulated in accordance with digital image data fed into it and the rotating mirror causes the modulated beam from the laser source to move in a fast scan direction perpendicular to the process direction of the photoreceptor 13. The laser source outputs a laser beam of sufficient power to charge or discharge the exposed surface on photoreceptor 13 in accordance with a specific machine design.

After selected areas of the photoreceptor 13 are discharged by the laser source, remaining charged areas are developed by developer unit 20 causing a supply of dry toner to contact the surface of photoreceptor 13. The developed image is then advanced by the motion of photoreceptor 13 to a transfer station including a transfer device 22, causing the toner adhering to the photoreceptor 13 to be electrically transferred to a substrate, which is typically a sheet of paper, to form the image thereon. The sheet of paper with the toner image thereon is then passed through a fuser 24, causing the toner to melt or fuse into the sheet of paper to create a permanent image.

One way in which print quality can be quantified is by measurement of the halftone area density, (i.e., the copy quality of a representative area), which is intended to be, for example, fifty percent (50%) covered with toner. The halftone is typically created by virtue of a dot screen of a particular resolution and, although the nature of such a screen will have a great effect on the absolute appearance of the halftone, any common halftone may be used. Both the solid area and halftone density may be readily measured by optical sensing systems that are familiar in the art.

As shown, densitometer 26 is used after the developing step to measure the optical density of the halftone density test patch created on the photoreceptor 13 in a manner known in the art. As used herein, the work "densitometer" is intended to apply to any device for determining the density of print material on a surface, such as a visible light densitometer, an infrared densitometer, an electrostatic volt meter, or any other such device which makes a physical measurement from which the density of print material may be determined. In accordance with the embodiments herein, the detectors can comprise an enhanced toner area coverage (ETAC) sensor to monitor the digital area coverage of halftone patches placed in the photoreceptor ID zone.

Thus, as shown in FIG. 6, one system embodiment comprises a print engine 11 that produces test patches using a control printing resolution, a detector 26 that measures the actual tone density of the test patches, and a processor 30. The processor 30 calculates the actual tone reproduction curve for the control printing resolution from the actual tone density of the test patches. The processor 30 can include, or be connected to, a comparator 32 that compares the actual tone reproduction curve with a target tone reproduction curve for the control printing resolution to determine an actual error value for each test patch. Then the processor 30 can calculate the estimated error values of tone density for corresponding test patches of the non-control printing resolution(s) based on the predetermined correlation between tone density errors of the control printing resolution and the tone density errors of the non-control printing resolution. Also, the processor 30 establishes the predetermined correlation between the tone density errors of the control printing resolution and the tone density errors of the non-control printing resolution based on empirical testing.

When calculating the estimated error values of the tone density for the corresponding test patches, the processor 30 multiplies each actual error value for each test patch by a predetermined scaling factor of tone density errors of the control printing resolution and tone density errors of the non-control printing resolution. When comparing the actual tone reproduction curve with the target tone reproduction curve the processor 30 compares multiple printing tones along the target tone reproduction curve.

Figure 7:
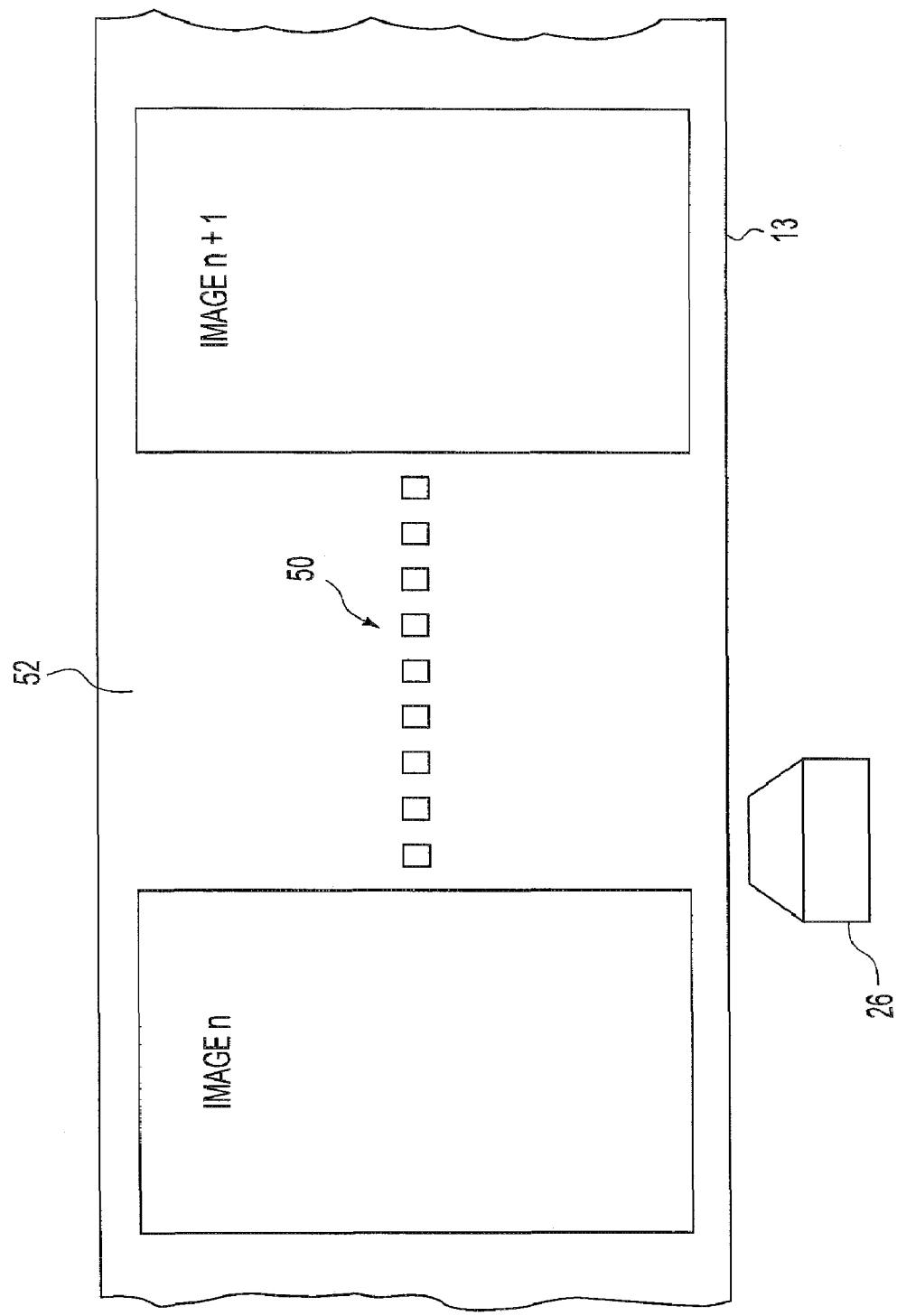
FIGS. 7 is a schematic representation of test patches.

FIG. 7 illustrates the basic process control method. An ETAC sensor 26 is used to monitor the digital area coverage (DAC) of halftone patches 50 placed in the inter-document zone 52 of the photoreceptor 13. It is to be appreciated that the arrangement of halftone patches 50 and ETAC sensor 26 as shown in FIG. 7 is provided as an aid to understanding concepts of the present embodiments herein and that other arrangements of halftone patches, with one or more sensors, including ETAC sensors or alternate types of sensors, are envisioned and fall within the scope of the present embodiments herein.

In one embodiment, 9 halftone patches are printed in the inter-document zone in order to measure the TRC at 9 points. While a 9 patch example is used herein, one ordinarily skilled in the art would understand that any number of patches could be used including, for example, 1, 5, 9, 15, 20 and more. The differences between the target TRC and the measured TRC at the 9 points are calculated. The 9 differences are fit using a three-term sine function in order to minimize the effects of noise. An adjustment is made to the look-up tables of the machines for the separations so the color printed remains consistent even though the underlying machine TRC may be changing. In order to minimize the effects of noise and to avoid customer perceptible print-to-print color variations, the LUT changes are kept small.

Figure 8:
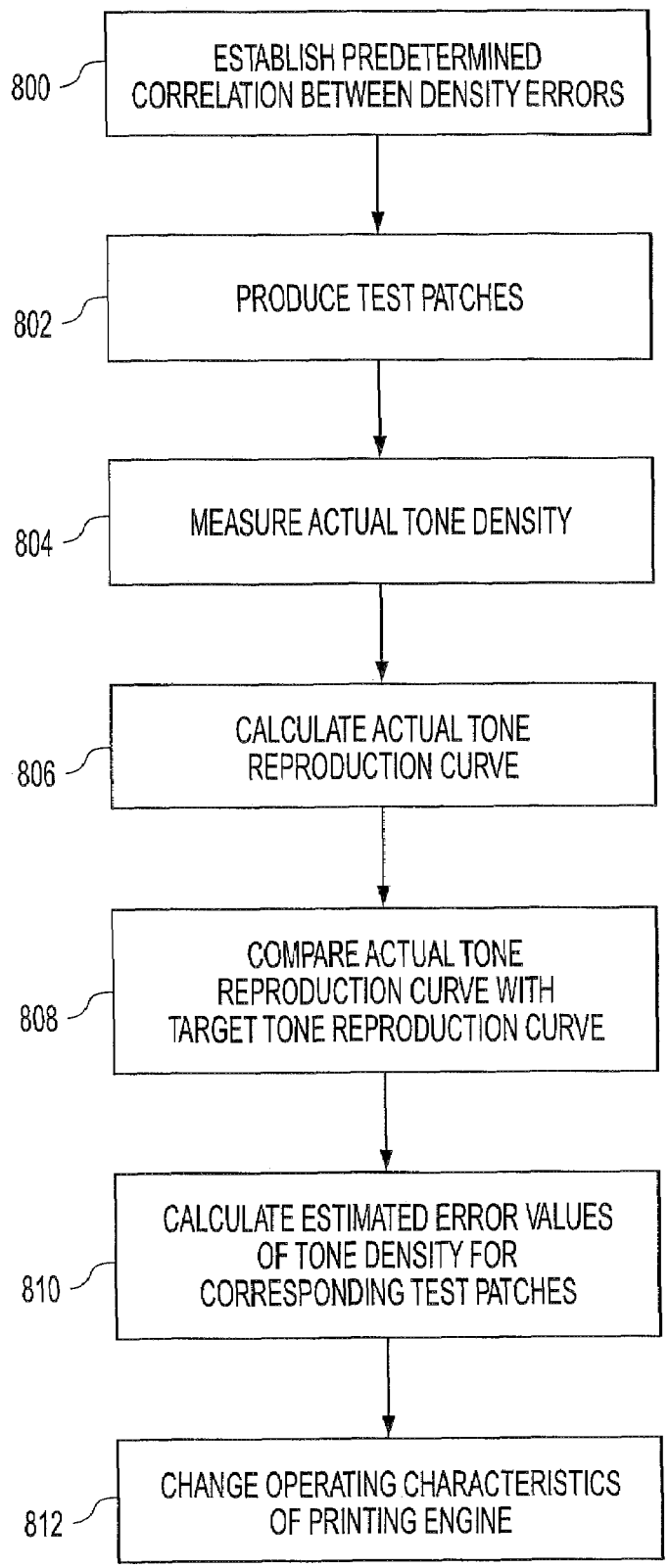
FIGS. 8 is a flow chart illustrating a method embodiment.

FIG. 8 is a flowchart showing a method embodiment. The method first establishes the predetermined correlation between the tone density errors of the control printing resolution and the tone density errors of the non-control printing resolution based on empirical testing (item 800). In item 802, the method produces test patches within a print engine using a control printing resolution during standard printing operations and, in item 804, measures the actual tone density of the test patches. Using this information the method calculates an actual tone reproduction curve for the control printing resolution from the actual tone density of the test patches (item 806).

In item 808, the method then compares the actual tone reproduction curve with a target tone reproduction curve for the control printing resolution to determine an actual error value for each test patch. Each of the test patches comprises a different printing tone. When comparing of the actual tone reproduction curve with the target tone reproduction curve the method compares multiple printing tones along the target tone reproduction curve.

From this, in item 810, the method can calculate estimated error values of tone density for corresponding test patches of at least one non-control printing resolution based on the predetermined correlation between tone density errors of the control printing resolution and tone density errors of the non-control printing resolution. When calculating the estimated error values of the tone density for the corresponding test patches, the method multiplies each actual error value for each test patch by a predetermined scaling factor. The scaling factor correlates the tone density errors of the control printing resolution and the tone density errors of the non-control printing resolution. Further, different non-control printing resolutions will have different scaling factors with respect to the control printing resolution.

This allows the method to change operating characteristics of the print engine to move the standard printing operations closer to the target tone reproduction curve, as shown in item 812. The control printing resolution and the non-control printing resolution are both utilized to perform standard printing operations by the print engine.

Thus, with the embodiments herein, in-situ measurements are made by a toner area coverage sensor on TRC patches from a single control dot screen developed on a cleanable surface and observed by a photoreceptor. The density of patches for other dot screens is estimated from the measured density of the control dot screen error of each measured patch multiplied by a scaling factor, which is different for each separation and patch density. This error is then added to the target TRC for each non-control dot screen to give an estimated density for each of the other dot screens. The TRC are then developed/updated using the estimated patch densities for each of the other dot screens. This substantially reduces the amount of toner and processing resources utilized.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
producing test patches with a print engine using a control printing resolution;
measuring actual tone density of said test patches;
calculating an actual tone reproduction curve for said control printing resolution from said actual tone density of said test patches;
comparing said actual tone reproduction curve with a target tone reproduction curve for said control printing resolution to determine an actual error value for each test patch; and
calculating estimated error values of tone density for corresponding test patches of at least one non-control printing resolution based on a predetermined correlation between tone density errors of said control printing resolution and tone density errors of said non-control printing resolution, wherein operating characteristics of the print engine are changed.

2. The method according to claim 1, further comprising establishing said predetermined correlation between said tone density errors of said control printing resolution and said tone density errors of said non-control printing resolution based on empirical testing.

3. The method according to claim 1, wherein said calculating of said estimated error values of said tone density for said corresponding test patches comprises multiplying each said actual error, wherein said predetermined scaling factor is based on a relationship between value for each test patch by a predetermined scaling factor tone density errors of said control printing resolution and tone density errors of said non-control printing resolution.

4. The method according to claim 3, wherein different non-control printing resolutions will have different predetermined scaling factors with respect to said control printing resolution.

5. The method according to claim 1, wherein each of said test patches comprises a different printing tone.

6. The method according to claim 5, wherein said comparing of said actual tone reproduction curve with said target tone reproduction curve compares multiple printing tones along said target tone reproduction curve.

7. The method according to claim 1, wherein said control printing resolution and said non-control printing resolution are utilized to perform standard printing operations by said print engine.

8. A method comprising:
producing test patches with a print engine using a control printing resolution during standard printing operations;
measuring actual tone density of said test patches;
calculating an actual tone reproduction curve for said control printing resolution from said actual tone density of said test patches;
comparing said actual tone reproduction curve with a target tone reproduction curve for said control printing resolution to determine an actual error value for each test patch;
calculating estimated error values of tone density for corresponding test patches of at least one non-control printing resolution based on a predetermined correlation between tone density errors of said control printing resolution and tone density errors of said non-control printing resolution; and
changing operating characteristics of said print engine to move said standard printing operations closer to said target tone reproduction curve.

9. The method according to claim 8, further comprising establishing said predetermined correlation between said tone density errors of said control printing resolution and said tone density errors of said non-control printing resolution based on empirical testing.

10. The method according to claim 8, wherein said calculating of said estimated error values of said tone density for said corresponding test patches comprises multiplying each said actual error, wherein said predetermined scaling factor is based on a relationship between value for each test patch by a predetermined scaling factor tone density errors of said control printing resolution and tone density errors of said non-control printing resolution.

11. The method according to claim 10, wherein different non-control printing resolutions will have different predetermined scaling factors with respect to said control printing resolution.

12. The method according to claim 8, wherein each of said test patches comprises a different printing tone.

13. The method according to claim 12, wherein said comparing of said actual tone reproduction curve with said target tone reproduction curve compares multiple printing tones along said target tone reproduction curve.

14. The method according to claim 8, wherein said control printing resolution and said non-control printing resolution are utilized to perform standard printing operations by said print engine.

15. A system comprising:
a print engine adapted to produce test patches using a control printing resolution;
a detector adapted to measure actual tone density of said test patches; and
a processor adapted to calculate an actual tone reproduction curve for said control printing resolution from said actual tone density of said test patches,
wherein said processor comprises a comparator adapted to compare said actual tone reproduction curve with a target tone reproduction curve for said control printing resolution to determine an actual error value for each test patch, and
wherein said processor is further adapted to calculate the estimated error values of tone density for corresponding test patches of at least one non-control printing resolution based on a predetermined correlation between tone density errors of said control printing resolution and tone density errors of said non-control printing resolution.

16. The system according to claim 15, wherein said processor is further adapted to establish said predetermined correlation between said tone density errors of said control printing resolution and said tone density errors of said non-control printing resolution based on empirical testing.

17. The system according to claim 15, wherein when calculating said estimated error values of said tone density for said corresponding test patches, said processor is further adapted to multiply each said actual error, wherein said predetermined scaling factor is based on a relationship between value for each test patch by a predetermined scaling factor tone density errors of said control printing resolution and tone density errors of said non-control printing resolution.

18. The system according to claim 17, wherein different non-control printing resolutions will have different predetermined scaling factors with respect to said control printing resolution.

19. The system according to claim 15, wherein each of said test patches comprises a different printing tone.

20. The system according to claim 19, wherein when comparing of said actual tone reproduction curve with said target tone reproduction curve, said processor is further adapted to compare multiple printing tones along said target tone reproduction curve.

* * * * *